(12) United States Patent
Sago et al.

(10) Patent No.: US 10,583,712 B2
(45) Date of Patent: Mar. 10, 2020

(54) PERCEIVABLE STEAM SUPPRESSING HEATER SYSTEM

(71) Applicant: DENSO CORPORATION, Kariya, Aichi-pref. (JP)

(72) Inventors: Yasuhiro Sago, Kariya (JP); Hideaki Kako, Kariya (JP); Kimitake Ishikawa, Kariya (JP); Hiroyasu Oide, Kariya (JP); Hideki Seki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/526,899

(22) PCT Filed: Dec. 4, 2015

(86) PCT No.: PCT/JP2015/006036
§ 371 (c)(1),
(2) Date: May 15, 2017

(87) PCT Pub. No.: WO2016/092792
PCT Pub. Date: Jun. 16, 2016

(65) Prior Publication Data
US 2017/0320376 A1    Nov. 9, 2017

(30) Foreign Application Priority Data

Dec. 10, 2014  (JP) ................. 2014-250181

(51) Int. Cl.
*B60H 1/22*    (2006.01)
*B60H 1/00*    (2006.01)
(Continued)

(52) U.S. Cl.
CPC .......... *B60H 1/22* (2013.01); *B60H 1/00292* (2013.01); *B60H 1/00735* (2013.01);
(Continued)

(58) Field of Classification Search
CPC .. B60H 1/2215; B60H 1/2218; B60H 1/2225; B60H 2001/2228; B60H 2001/2231; B60H 2001/224; B60H 2001/2256
See application file for complete search history.

(56) References Cited

U.S. PATENT DOCUMENTS

2003/0039298 A1*  2/2003  Eriksson ............ B60H 1/00785
                                                  374/109
2003/0089493 A1*  5/2003  Takano .............. B60H 1/00914
                                                  165/202
(Continued)

FOREIGN PATENT DOCUMENTS

JP    H01168990 U    11/1989
JP    2008041343 A    2/2008
(Continued)

*Primary Examiner* — Nelson J Nieves
(74) *Attorney, Agent, or Firm* — Harness, Dickey & Pierce, P.L.C.

(57) ABSTRACT

A heater is installed indoors and heated to a target temperature. The heater is controlled by a controller. The controller has a regular control module which heats the heater to reach the target temperature. In addition, the controller has a suppressive control module which heats the heater to a suppressed temperature lower than the target temperature by electric power suppressed so that surface moisture adhering on the surface of the heater is decreased. When an activation of the heater is ordered, the heater is heated by the suppressive control module, after that, the heater is heated by the regular control module. The surface moisture is decreased by the suppressed temperature. Therefore, generating rapid boiling and/or rapid evaporation of the surface moisture by the target temperature may be suppressed.

9 Claims, 5 Drawing Sheets

(51) Int. Cl.
*B60H 3/02* (2006.01)
*H05B 3/00* (2006.01)
*H05B 3/26* (2006.01)
*H05B 3/34* (2006.01)
*H05B 1/02* (2006.01)

(52) U.S. Cl.
CPC ......... *B60H 1/2215* (2013.01); *B60H 1/2226* (2019.05); *B60H 3/024* (2013.01); *H05B 1/0236* (2013.01); *H05B 3/00* (2013.01); *H05B 3/267* (2013.01); *H05B 3/34* (2013.01); *B60H 2001/2228* (2013.01); *B60H 2001/2246* (2013.01); *H05B 2203/003* (2013.01); *H05B 2203/013* (2013.01)

(56) References Cited

U.S. PATENT DOCUMENTS

| | | | | |
|---|---|---|---|---|
| 2009/0189617 | A1* | 7/2009 | Burns | E21B 43/24 324/649 |
| 2010/0176110 | A1* | 7/2010 | Ogino | B60H 1/00271 219/202 |
| 2011/0016902 | A1* | 1/2011 | Eisenhour | B60H 3/024 62/271 |
| 2011/0079029 | A1* | 4/2011 | Morisaku | B60H 1/00392 62/94 |
| 2012/0061365 | A1 | 3/2012 | Okamoto et al. | |
| 2012/0217232 | A1* | 8/2012 | Hermann | B60H 1/2215 219/202 |
| 2012/0234932 | A1 | 9/2012 | Okamoto et al. | |
| 2013/0052929 | A1* | 2/2013 | Eisenhour | B60H 1/00742 454/75 |
| 2013/0161308 | A1* | 6/2013 | Bohlender | H05B 3/02 219/202 |
| 2013/0270249 | A1* | 10/2013 | Suzuki | B60H 1/143 219/202 |
| 2014/0318159 | A1* | 10/2014 | Eisenhour | B60H 1/3207 62/89 |
| 2015/0110477 | A1 | 4/2015 | Ota et al. | |
| 2016/0059669 | A1 | 3/2016 | Sagou et al. | |
| 2016/0144690 | A1* | 5/2016 | Wittkowski | H05B 3/145 219/202 |
| 2016/0200172 | A1* | 7/2016 | Nakashima | H05B 1/0236 237/5 |
| 2016/0200173 | A1* | 7/2016 | Yamashita | B60H 1/2225 219/202 |
| 2016/0288621 | A1* | 10/2016 | Sakane | B60H 1/2218 |
| 2017/0129310 | A1 | 5/2017 | Sagou et al. | |

FOREIGN PATENT DOCUMENTS

| | | |
|---|---|---|
| JP | 2010052710 A | 3/2010 |
| JP | 2012056531 A | 3/2012 |
| JP | 2012192827 A | 10/2012 |
| JP | 2012192829 A | 10/2012 |
| JP | 2014000944 A | 1/2014 |
| JP | 2014003000 A | 1/2014 |
| JP | 2014189251 A | 10/2014 |
| KR | 20130005155 A * | 1/2013 |

* cited by examiner

PERCEIVABLE STEAM SUPPRESSING HEATER SYSTEM

CROSS REFERENCE TO RELATED APPLICATIONS

This application is a U.S. National Phase Application under 35 U.S.C. 371 of International Application No. PCT/JP2015/006036 filed on Dec. 4, 2015 and published in Japanese as WO 2016/092792 A1 on Jun. 16, 2016. This application is based on and claims the benefit of priority from Japanese Patent Application No. 2014-250181 filed in Japan on Dec. 10, 2014. The entire disclosures of all of the above applications are incorporated herein by reference.

TECHNICAL FIELD

Disclosure in this description is related to a heater device for an interior use installed in indoors.

BACKGROUND

Patent Literature 1 to Patent Literature 5 disclose heater device which is disposed indoors and provide sense of warmth to the human. The heater device may also be called as a heating heater apparatus. The heater device may also be called as an electric heating heater apparatus. One form of the heater devices is also called as a radiant heater device which gives warmth to the human by radiation. One application of the heater devices is a vehicle use. The heater devices disclosed in Patent Literature 1 to Patent Literature 5 are disposed to face interior.

CITATION LIST

Patent Literatures

[Patent Literature 1] JP2010-52710A
[Patent Literature 2] JP2012-56531A
[Patent Literature 3] JP2014-944A
[Patent Literature 4] JP2014-3000A
[Patent Literature 5] JP2014-189251A

SUMMARY

Moisture may adhere to a surface of a member put indoors, or a surface of a wall which defines the rooms. For example, moisture may adhere on the surface by rain or snow blows in through a window or a door. In addition, due to humidity in the air, water may be condensed on a surface. For example, the condensation is generated depending on indoor humidity and temperature of a wall. In addition, in case of a vehicle, there may be considerable condensation due to a small interior of a room and a configuration which is easy to conduct outside air temperature. In addition, since rain and snow may be blow in an inside of vehicle, an interior surface in a vehicle gets wet easily.

If a heater device generates heat when moisture or water drops exceeding predetermined quantity are on the surface of the heater device, the moisture may boil and evaporate. At this time, some steam may be emitted, and/or some smell may be emanated. Although such phenomenon may be perceived by a user, but it is preferable to suppress boiling and/or evaporation of moisture so that it may not be perceived by the user. In the above viewpoint, or in the other viewpoint not mentioned above, further improvement of an inside use heater device is still demanded.

It is one object of the disclosure to provide an indoor heater device which can suppress boiling of moisture and/or rapid evaporation of moisture on a heater device.

It is another object of the disclosure to provide an indoor heater device which can suffice both of providing quick sense of warmth and of suppressing disadvantage caused by boiling of moisture and/or rapid evaporation of moisture.

The disclosure in this description adopts the following technical means. The symbols in the parenthesis indicated in the claims and/or this section merely show correspondence relations with concrete elements described in embodiments later mentioned as one example, and are not intended to limit the technical scope of this disclosure.

Disclosure provides a heater device. A heater device has a heater which is installed indoors of a room of a movable body to emit the heat radiation to feet of a passenger of the movable body, and heated to a target temperature, and a regular control module which heats the heater so that the heater reaches the target temperature, and a suppressive control module which heats the heater to a suppressed temperature lower than the target temperature with electric power suppressed so that moisture adhered on the surface of the heater is decreased. After being ordered to activate the heater, the heater is heated by the suppressive control module. After the heater is heated by the suppressive control module, the heater is heated by the regular control module.

A heater is heated, when an activating the heater is ordered. The heater is heated to the target temperature, after the heater is heated at the suppressed temperature lower than the target temperature with electric power suppressed. In a case that moisture is adhered on the heater surface, the moisture is decreased by the suppressed temperature. Therefore, it is suppressed that moisture adhered on the heater surface is rapidly heated by the target temperature, and generates rapid boiling and/or rapid evaporation.

DETAILED DESCRIPTION

Figure 1:
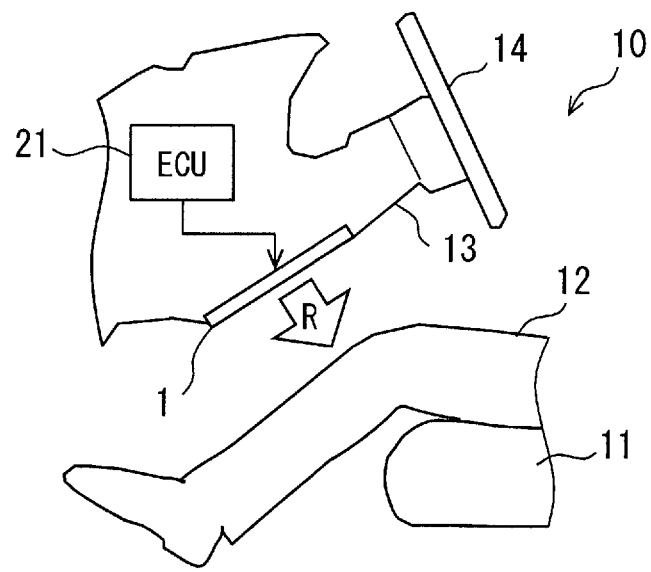
FIG. 1 is a cross sectional view of a vehicle showing a radiant heater device according to a first embodiment.

A plurality of embodiments are described referring to the drawings. In the embodiments, the same parts and components as those in each embodiment are indicated with the same reference numbers and the same descriptions will not be reiterated. Components and parts corresponding to the components and parts described in the preceding description may be indicated by the same reference number and may not be described redundantly. In a case that only a part of component or part is described, other descriptions for the other embodiment may be referenced or incorporated as descriptions for the remaining part of component or part.

First Embodiment

In FIG. 1, a heater device according to this embodiment has a heater device 1 using radiant heat. The heater device 1 may be also called as a heater element. The heater device 1 is installed in an interior of a room of movable bodies, such as a road motor vehicle, a marine vessel, and an aircraft. The heater device 1 may be installed in a room, such as a residence and a place of business. The heater device 1 provides a part of an air-conditioning apparatus 10 for heating at least the interior of the room. The heater device 1 is an electric heater device which generates heat in response to electric power supply from a power source, such as a battery, a generator, etc. which are carried in the movable body. The heater device 1 is formed in a shape of thin plate. The heater device 1 generates heat by being supplied with electric power. The heater device 1 emits a heat radiation R mainly towards a direction vertical to a surface thereof, in order to warm an object positioned in the direction vertical to the surface.

In the room, a seat 11 for a passenger 12 to sit down is installed. The heater device 1 is disposed in the room to emit the heat radiation R to feet of the passenger 12. The heater device 1 can be used as a heater device for providing warm feeling immediately to the passenger 12 at a stage immediately after starting of the air-conditioning apparatus 10. The heater device 1 is disposed on a wall of the room. The heater device 1 is disposed so that the device 1 faces the passenger 12 in an assumed usual posture. For example, the road vehicle has a steering column 13 for supporting a steering wheel 14. The heater device 1 may be disposed on an underside of the steering column 13 to face the passenger 12.

The heater device 1 is disposed so that a front surface is exposed towards an interior of a room. The heater device 1 is substantially exposed to the room, without having a covering member for preventing that the passenger 12 touches the surface of the heater device 1 directly. The heater device 1 may have a covering member made of a metal mesh, resin, etc., or a fabric cloth as an interior materials in a room interior side.

The heater device 1 is controlled by a controller (ECU) 21. The controller 21 controls ON and OFF of power supply to the heater device 1 and electric energy during power supply.

Figure 2:
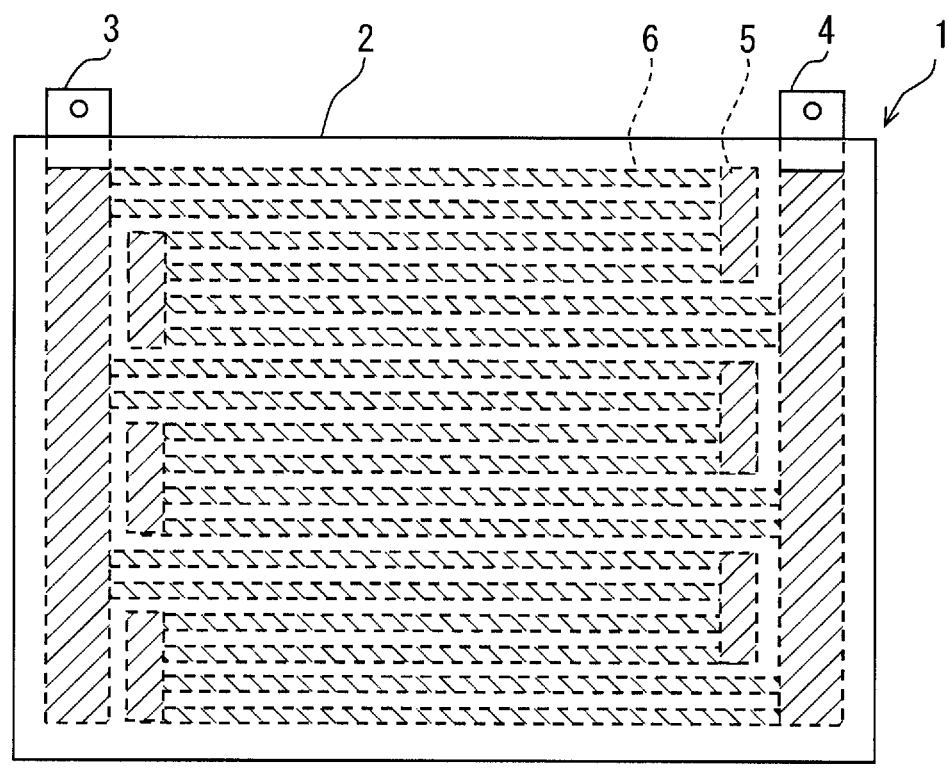
FIG. 2 is a plan view of the radiant heater device according to the first embodiment.

In FIG. 2, the heater device 1 is formed in a shape of an almost square flat plate. The heater device 1 is also called as a plate shaped heater or a flat-surface heater. The heater device 1 has a substrate part 2, a plurality of electrodes 3, 4, and 5, and a plurality of heating parts 6. The electrodes 3 and 4 are external electrodes for electric power supplies. The electrodes 5 are internal connecting purpose electrodes for connecting the heating parts 6 in parallel and/or in series. A plurality of electrodes 5 and a plurality of heating elements 6 are laid under the substrate part 2. In the drawing, in order to show the electrodes 5 and the heating parts 6, hatchings are illustrated. The heater device 1 may also be called a plate shaped heater which emits a heat radiation R mainly towards a direction vertical to the surface.

The substrate part 2 is made of a resin material which provides fine electrical insulation properties and withstands in elevated temperature. The substrate part 2 provides the surface. The substrate part 2 is formed in a shape of a flat plate. The substrate part 2 is given a curved surface corresponding to a surface of an attached wall. The substrate part 2 has the rigidity which can maintain the configuration. The substrate part 2 can have the flexibility for enabling deformation to fit on the surface of the wall. The substrate part 2 may be made with thermoplastic resin. The substrate part 2 is a multilayer substrate. The substrate part 2 is a member for supporting the electrodes 3, 4 and 5, and the heating parts 6.

The heating parts 6 are embedded within the substrate part 2. Therefore, the heating parts 6 are not exposed to the surface of the substrate part 2. The heating parts 6 are protected by the substrate part 2. The heating parts 6 are formed in thin plate shapes parallel to the surface of the substrate part 2. The heating parts 6 can emit the heat radiation R by heat supplied by power supply. The heating parts 6 can emit the heat radiation R which may make the passenger 12, i.e., a person, to feel warmth, by heated to a predetermined radiation temperature.

The electrodes 3, 4, and 5 are made by material that generates fewer calories than that of the heating parts 6 when it is supplied with electric power. The electrodes 3, 4, and 5 are made by material with low specific resistance so that a current can be evenly distributed to the plurality of heating parts 6. The electrodes 3, 4, and 5 may be made of metal material. The electrodes 3, 4, and 5 may be made of tin alloy. The electrodes 3, 4, and 5 may be made of alloy containing copper, silver, and tin. In addition, the electrodes 3, 4, and 5 may be made of materials with good conductivity, such as a copper alloy or an aluminum alloy.

The heating parts 6 are made by material which generates heat by being supplied electric power. The heating parts 6 may be made of metal material. The heating parts 6 may be made of tin alloy. The heating parts 6 may be made of alloy containing copper, silver, and tin. In addition, the heating parts 6 may be made of materials for heater wire, such as a stainless alloy, a nickel-chromium alloy or an aluminum alloy.

In this embodiment, the heater device 1 is formed so that, if a body contacts the surface, the temperature in that contact part may fall significantly by a heat transfer to the body. The human body can be assumed as a body. The heater device 1 is constituted so that a temperature of the contact part may fall even to the temperature which humans do not feel displeasure with a superfluous thermal energy at the time of short contact.

Thea heater device 1 may be provided with various configurations. Devices which may be used as the heater devices 1 are discloses in the documents listed as conventional technique. The content of the above listed prior art patent documents are incorporated herein by reference as description for technical components disclosed in this description.

The surface of the heater device 1 has a water-repellent characteristic for suppressing adhesion of moisture. A material which has high water-repellent characteristic is used on the surface of the heater device 1. Specifically, it uses a water-repellent material which is a silicon resin group or a fluoro resin group which can provide a water drop contacting angles of 100 degrees or above. Even if a water drop adheres on the surface of the heater device 1, the water drop flows and falls easily. As a result, a water capacity on the surface of the heater device 1 is suppressed. Accordingly, rapid boiling and/or evaporation of water immediately after starting the heater device 1 are suppressed.

Figure 3:
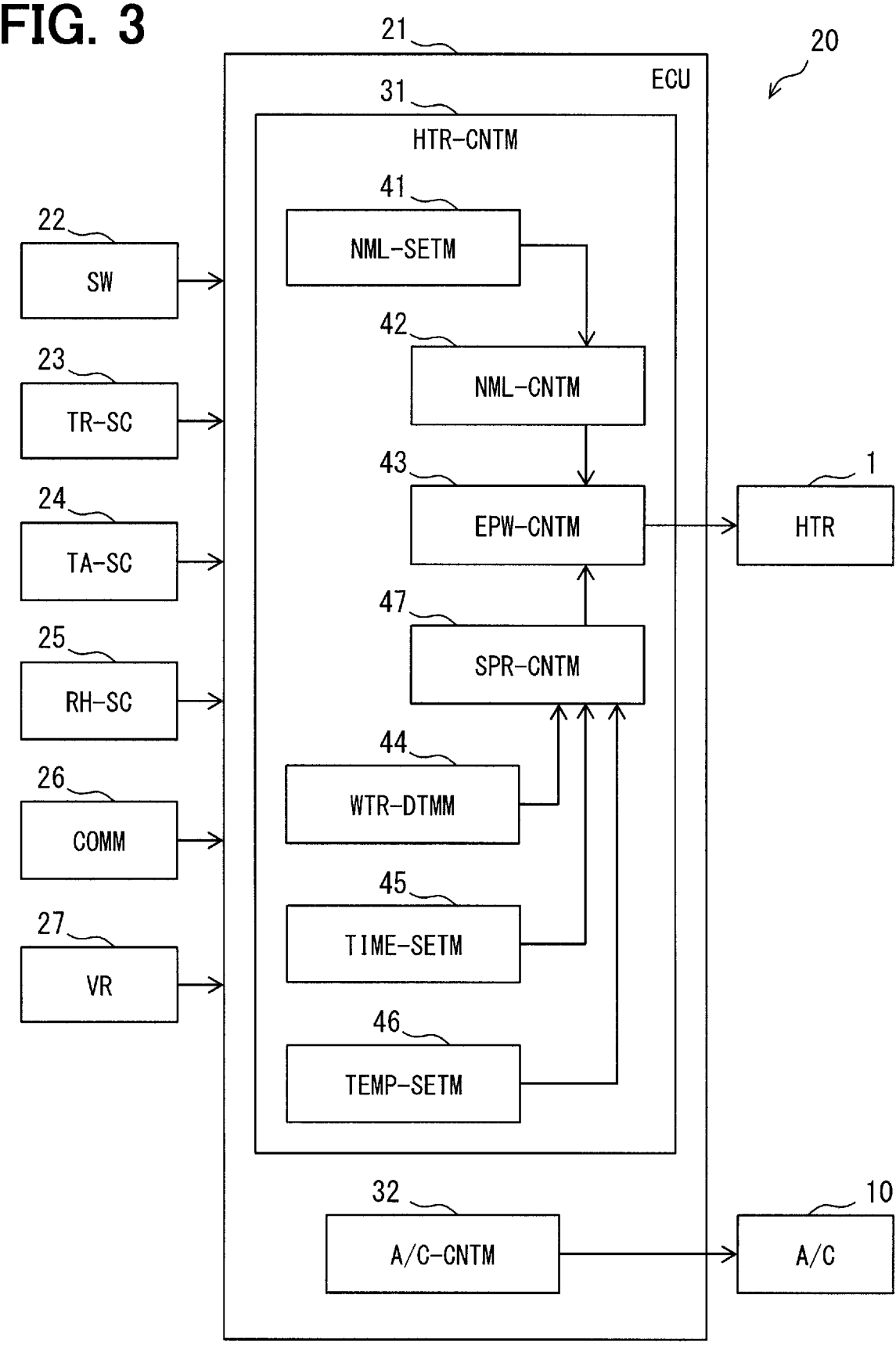
FIG. 3 is a block diagram showing a control system in the first embodiment.

FIG. 3 shows a control system 20. In the control system 20, the controller (ECU) 21 is an electronic control unit. The controller has at least one processing unit (CPU) and at least one memory (MMR) as a storage medium which stores and memorizes a program and data.

The controller is provided by a microcomputer which has a storage medium which can be read by computer. The storage medium is a non-transitory storage medium which stores a program readable by the computer. The storage medium may be provided with semiconductor memory or a magnetic disc. The controller may be provided with a computer or a set of computer resources linked by a data communication device. The program, when the controller executes the program, makes the controller to function as the apparatus described in this specification, and makes the controller to function to perform methods, such as control method, described in this specification. The controller provides various components. At least a part of the components may be referred to as means for performing function, and from the other viewpoint, at least a part of the components may be referred to as a block that shall be interpreted as a structure or module that shall be interpreted as a structure.

Means and/or function provided by the electric control unit may be provided by software stored in a tangible memory device and a computer executing it, only software, only hardware, or those combinations. For example, in a case that the electric control unit is provided by the electronic circuit which is hardware, it may be provided by a digital circuit containing many logic circuits or an analog circuit.

The control system has a plurality of signal sources. The signal sources are provided by sensors or the controller. The signal sources output signals which show information. A signal is inputted into the controller via an independent signal line or a data communication connection, such as LAN. The controller acquires information by storing the information which a signal shows into the memory device. The control system performs control processing with the controller. The control system controls one or more control objects by control processing.

The control system 20 controls a heater (HTR) 1 and an air-conditioner (A/C) 10. The air-conditioner 10 heats inside of a room at least. Further, the air-conditioner 10 may be constituted to provide cooling and/or ventilation.

The control system 20 has an activation signal source (SW) 22 which supplies an activation command signal to the controller 21 for ordering to activate the heater 1 and the air-conditioner 10. The activation signal source 22 may be provided with a starting switch. In addition, the activation signal source 22 may be provided with a timer apparatus which outputs the activation command signal when a predetermined time comes, or with a pre-activating device which outputs the activation command signal automatically, in order to preheat the heater 1 before a user go into the room.

The control system 20 has a plurality of signal sources which supply indoor and outdoor information relevant to air conditioning to the controller 21. The control system 20 has an inside air temperature signal source (TR-SC) 23 for supplying an inside air temperature signal which shows an inside air temperature to the controller 21. The control system 20 has an outside air temperature signal source (TA-SC) 24 for supplying an outside air temperature signal which shows an outdoor air temperature to the controller 21. The control system 20 has a humidity signal source (RH-SC) 25 for supplying a humidity signal which shows an inside air humidity to the controller 21. The humidity signal source 25 is also a signal source which supplies the signal for evaluating an amount of moisture on a surface of an indoor member to the controller 21. The control system 20 has a communication device (COMM) 26 for supplying information which can be used to evaluate the amount of moisture on the surface of the indoor member from an external system to the controller 21. The control system 20 has a target temperature signal source (VR) 27 for supplying a target temperature signal of the heater 1 to the controller 21.

The controller 21 has a heater control module (HTR-CNTM) 31 for controlling the heater 1. The heater control module 31 controls electric power to be supplied to the heater 1. The controller 21 has an air-conditioning-control module (A/C-CNTM) 32. The air-conditioning-control module 32 controls the air-conditioner 10. The controller 21 may be an apparatus which makes it the main duty to control the air-conditioner 10. The heater control module 31 can be provided by a control module additionally added to the controller 21.

The heater control module 31 has a regular output setting module (NML-SETM) 41 for setting output of the heater 1. The regular output setting module 41 sets a temperature of the heater 1 in case the heater 1 is usually operated based on the target temperature of the heater 1 which may be set by user manual operation. The target temperature is also called a target output. For example, the control system 20 can have the target temperature signal source 27 which sets the output of the heater 1 into triple stages, such as HI, MID, and LOW. The regular output setting module 41 sets the target temperature in response to the target temperature signal source 27. The heater 1 emits radiant heat, when heated to radiation temperature. Therefore, the regular output setting module 41 sets the target temperature within a range of radiation temperature.

The heater control module 31 has a regular control module (NML-CNTM) 42. The regular control module 42 set a regular power supply schedule so that the output of the heater 1 is promptly increased and maintained towards the target temperature set by the regular output setting module 41. The regular control module 42 controls power supply so that the temperature of the heater 1 reaches the target temperature from an initial temperature within a first activating time period. The first activating time period is the quickest activating time permitted to the heater 1. The first activating time period is set in order to provide a sense of heat promptly to a user.

The heater control module 31 has an electric-power control module (EPW-CNTM) 43. The electric-power control module 43 includes an electric-power controlling circuit which can adjust an amount of electric power to the heater 1. The electric-power control module 43 adjusts the amount of electric power to the heater 1, i.e., power supply, along with the regular power supply schedule set by the regular control module 42.

The heater control module 31 has a moisture determining module (WTR-DTMM) 44. The moisture determining module 44 determines whether the moisture exceeding a predetermined threshold value is adhered on a surface of the heater 1. In the following description, "condition that the moisture exceeding a predetermined threshold value is adhered on the surface of the heater 1" is called "wet condition." In addition, "moisture which is adhered on the surface of the heater 1" is called "surface moisture."

The moisture determining module 44 can be said that it determines that whether an inner surface of an indoor wall is the wet condition or not. The moisture determining module 44 determines whether it is the wet condition or not, when the heater 1 is activated. The moisture determining module 44 outputs a moisture monitoring signal, when it is in the wet condition. The moisture determining module 44 may be provided by the sensor which detects whether the moisture exceeding the predetermined threshold value is actually adhered on the surface of a heater 1 and/or operational calculation. The moisture determining module 44 may be provided by the sensor which estimates or predicts whether the moisture exceeding the predetermined threshold value is actually adhered on the surface of a heater 1 and/or operational calculation. The moisture determining module 44 is constituted so that the surface moisture resulting from rain or snow and/or the surface moisture resulting from water condensation may be evaluated.

In this embodiment, the moisture determining module 44 determines whether it is the wet condition or not resulting from water condensation. In other words, the moisture determining module 44 determines whether the amount of moisture exceeding the predetermined threshold value is adhering on the inner surface of the wall, or whether there is possibility or not that the amount of moisture exceeding the predetermined threshold value is adhered on the inner surface of the wall. The moisture determining module 44 can also be called a water condensation determining module.

The moisture determining module 44 may be constituted to output a water condensation signal as the moisture monitoring signal when it is the wet condition resulting from water condensation. Existence and nonexistence of water condensation and a water condensation amount may be estimated by satisfying a surrounding atmosphere of the heater 1 fulfills condition which produces water condensation on the surface of the heater 1. The water condensation amount may be called as a moisture amount. For example, the moisture determining module 44 may estimate the water condensation amount based on at least one of the inside air temperature, the ambient air temperature, and a humidity of inside air. Those temperature and/or humidity are acquirable using the sensor equipped on the air-conditioner 10. For example, the moisture determining module 44 estimates the water condensation amount based on temperature and/or humidity when the heater 1 is activated.

The moisture determining module 44 may be constituted to estimate the water condensation amount based on historical information including a temperature and/or humidity before the heater 1 is activated. For example, the moisture determining module 44 estimates the water condensation amount based on an indoor absolute humidity when a user leaves a room last time, and a variation amount of the inside air temperature or the ambient air temperature after leaving the room. For example, the water condensation amount on the surface of the heater 1 may be estimated based on the indoor absolute humidity at a time of previous utilization, and a decrease amount of the inside air temperature between the time of previous utilization and a time of activating this time.

For example, the moisture determining module 44 estimates the water condensation amount based on a surrounding temperature and/or a humidity of the heater 1 just before the heater 1 is activated. For example, the moisture determining module 44 estimates the water condensation amount based on a change of the temperature and/or the humidity for a passed predetermined time period from the activation of the heater 1. For example, the moisture determining module 44 estimates the water condensation amount based on the surrounding temperature and/or humidity just before the activation of the heater 1, and a change of the temperature and/or the humidity for a passed predetermined time from the activation of the heater 1. Specifically, when the inside air temperature and/or the ambient air temperature is lower than 0 (zero) ° C., the water condensation exceeding a predetermined threshold value may be estimated affirmative. In addition, even if the temperature just after the activation of the heater 1 is not lower than 0 (zero) ° C., in a case that it is a normal temperature and a great humidity, i.e., the inside air temperature is 20° C. and the humidity is more than 50% RH, then, it is possible to estimate the water condensation exceeding a predetermined threshold value affirmative. The moisture determining module 44 can include operation which estimates the moisture amount remaining in the car by using a temperature sensor at a time of the last use of the car, a humidity sensor, information about number of people in the car, information about the weather, etc., information which may be used to estimate the temperature and/or the humidity. In this case, the moisture determining module 44 estimates the water condensation amount based on the moisture amount which remains indoors, and the temperature information at the time of activation.

The moisture determining module 44 may be constituted so that it may determine whether it is the wet condition based on the geographical information indicative of a present location, etc., and weather information which the controller 21 acquires from an external system through the communication machine 26. For example, the moisture determining module 44 may be constituted to determine the wet condition when it is a period of raining or snowing, when it is a period just after raining or snowing, and when it is a period of fogging, etc. Such weather information may be acquired from a weather information server etc. For example, the moisture monitoring signal may be outputted in the case where after a car moved from a warm area to a cold area, after a car parked near a lake, and a car is parking at a cold district etc. For example, the moisture determining module 44 may determine whether it is a water condensation creatable season or not based on a calendar, and may output the moisture monitoring signal when it is the water condensation creatable season. The moisture determining module 44 may be constituted to output the water condensation signal by using one of the plurality of methods described in this specification, or by using a combination of the plurality of method.

The moisture determining module 44 may be constituted to detect the actual moisture amount on the surface of the heater 1, and to output the moisture monitoring signal in response to the detected result. For example, the moisture determining module 44 outputs the moisture monitoring signal, when the relative humidity on the surface of the heater 1 exceeds the predetermined threshold value. For example, the moisture determining module 44 outputs the water condensation signal, when a water drop exists on the surface of the heater 1. The water drop is detectable based on an electric resistance value or a capacitance value on the surface of the heater 1. In a case that detecting the water drop electrically, a plurality of sensing electrodes may be arranged on the surface of the heater 1. Alternatively, the water drop may be optically detected. For example, a light emitting element and a photo acceptance unit may be arranged to detect change of reflection or refraction of light corresponding to the existence or nonexistence of the water drop on the surface of the heater 1. In this case, the humidity signal source 25 may be replaced with a water drop signal source including a water drop detector.

In this embodiment, the moisture determining module 44 estimates the water condensation based on the humidity indicated by the humidity signal source 25 and the temperature indicated by the inside air temperature signal source 23 and/or the outside air temperature signal source 24, and outputs the moisture monitoring signal. Specifically, it assumes the inside air temperature as the temperature of the surface of the heater 1, and if it is determined that the relative humidity on the surface of the heater 1 exceeds 100% based on the humidity of indoor air, then, the water condensation is estimated affirmative.

The heater control module 31 has the suppressing time signal setting section (TIME-SETM) 45. The suppressing time signal setting section 45 sets the suppressing time for delaying the activating time of the heater 1 so that it becomes longer than the first activating time period. The suppressing time can be made into fixed time or adjustable time.

The suppressing time is a time which can decrease the surface moisture amount by heating the heater 1 to the suppressed temperature which is lower than the target temperature. It is enough longer than time periods relevant to electrical transient phenomenon, such as time for suppressing the inrush current to the heater 1. The suppressing time can be set to several seconds from tens of seconds. An example of a typical suppressing time is 40 seconds.

When the suppressing time is made into adjustable time, the suppressing time can be given as a function of the amount of the surface moisture. In this case, the suppressing time changes according to moisture amount. For example, the suppressing time is set longer, as moisture amount increases. Thereby, it is possible to increase the temperature of the heater 1 to the radiation temperature, after decreasing the moisture adhering on the surface of the heater 1.

The above-mentioned moisture amount can be made into the actually detected amount or the estimated amount. In addition, the moisture amount can be substituted with other indices which show moisture amount. For example, in many cases, moisture amount depends on an inside air temperature. Therefore, the above-mentioned moisture amount may be substituted for the inside air temperature. In this case, the suppressing time is set longer, as the inside air temperature becomes low.

The heater control module 31 has the suppressed temperature signal setting section (TEMP-SETM) 46. The suppressed temperature signal setting section 46 sets the suppressed temperature in process of delaying an activating time of the heater 1. The suppressed temperature is the temperature for evaporating slowly condensed water which has adhered on the surface of the heater 1. The suppressed temperature is lower than the temperature set by the regular output setting module 41. The suppressed temperature may be a fixed temperature or a variable temperature.

The suppressed temperature is lower than the radiation temperature in which the heater 1 may function as a radiation heater. The suppressed temperature is lower than the target temperature at which the heater 1 exhibits original heating functions. The suppressed temperature is temperature which evaporates the surface moisture gradually. The suppressed temperature is temperature at which the surface moisture is not boiled rapidly. The suppressed temperature is higher than the room temperature of the heater 1. The suppressed temperature is higher than the inside air temperature and the ambient air temperature. The suppressed temperature is the temperature which can decrease the surface moisture.

When the suppressed temperature is the variable temperature, the suppressed temperature may be given as a function of moisture amount. In this case, the suppressed temperature changes according to moisture amount. For example, the suppressed temperature is set lower, as the moisture amount increases. Thereby, the moisture is more slowly decreased by a low suppressed temperature, as there is much moisture amount. Accordingly, intense boiling of the moisture and evaporation are suppressed.

The heater control module 31 has a suppressive control module (SPR-CNTM) 47. The suppressive control module 47 heats the heater 1 to the suppressed temperature lower than the target temperature with the electric power suppressed from the electric power provided by the regular control module so that the moisture adhered on the surface of the heater 1 is decreased. The suppressive control module 47 sets a suppressive power supply schedule for substituting the regular power supply schedule set by the regular control module 42, when the wet condition is determined by the moisture determining module 44. The suppressive power supply schedule suppresses the electric power supplied to the heater 1 so that it becomes lower than the usual electric power ordered by the regular control module 42. The suppressive power supply schedule is set based on the suppressing time and the suppressed temperature. The suppressive control module 47 sets the suppressive power supply schedule so that the temperature of the heater 1 may rise slowly rather than the regular power supply schedule which the regular control module 42 set. The suppressive control module 47 controls electric current so that the temperature of the heater 1 reaches the target temperature from the initial temperature by spending a second activating time period which is longer than the first activating time period. The second activating time period is characterized by a suppressing time and a suppressed temperature.

When the wet condition is determined by the moisture determining module 44, the electric-power control module 43 adjusts the current amount to the heater 1, i.e., power supply, along the suppressive power supply schedule set by the suppressive control module 47. That is, after the heater 1 is ordered to be activated, and after the heater 1 is heated by the suppressive control part, after that, the heater 1 is heated by the regular control part.

By setting the second activating time period longer than the first activating time period, the temperature of the heater 1 under the suppressive power supply schedule is set to lower temperature than the temperature of the heater 1 under the regular power supply schedule over a long time period. As a result, the surface moisture evaporates gradually and is decreased. As a result, boiling and evaporation of the surface moisture are suppressed. Thereby, disadvantages caused by the intense boiling of the surface moisture and/or the rapid evaporation of water drop is suppressed.

Figure 4:
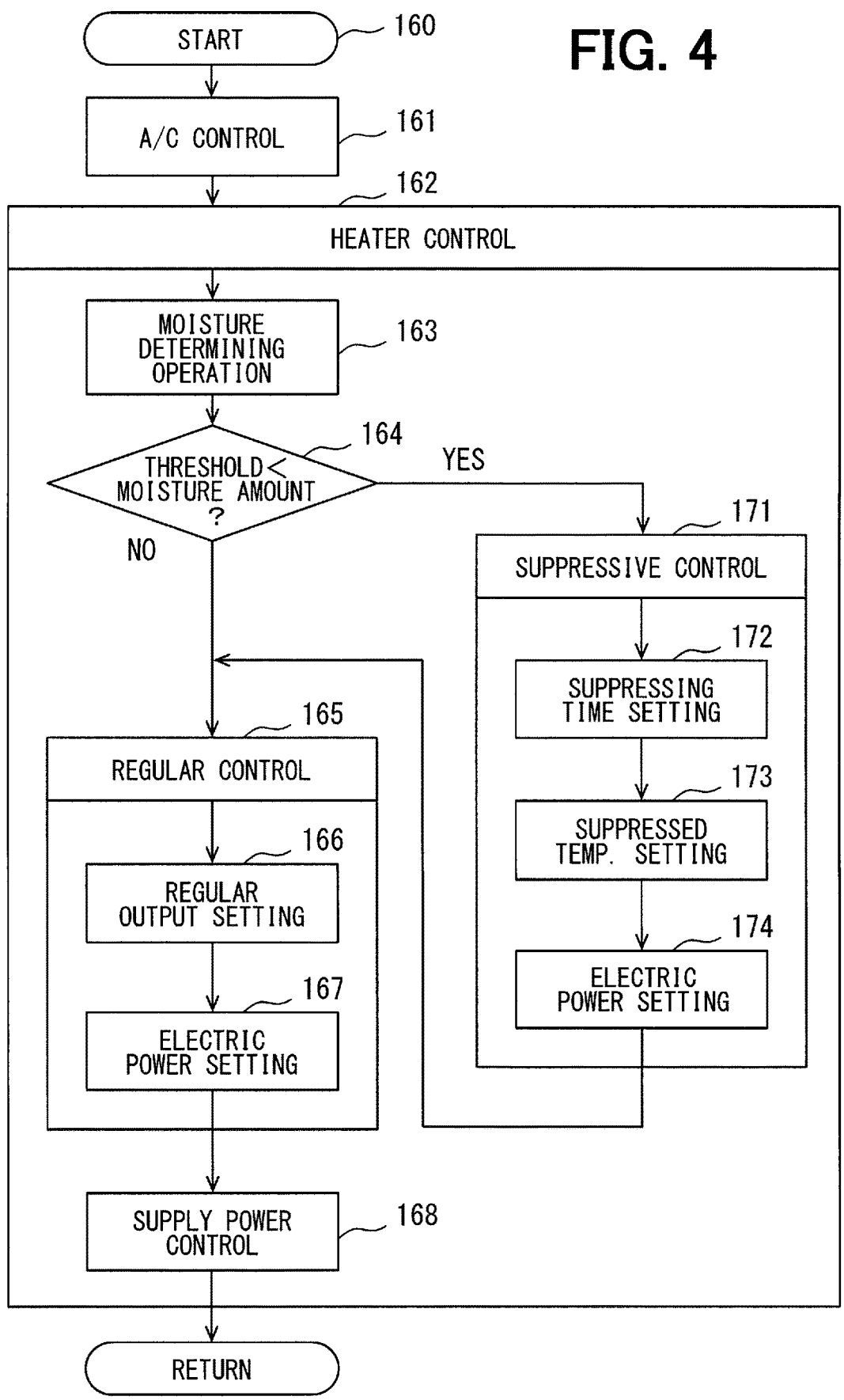
FIG. 4 is a flow chart showing a control process in the first embodiment.

FIG. 4 is a flowchart which shows the control processing 160 performed by the controller 21. In step 161, the controller 21 performs an air conditioning control for an air-conditioner 10. In step 162, the controller 21 performs a heater control for the heater 1.

In step 163, the controller 21 performs moisture determining operation for determining whether the amount of the surface moisture exceeds the predetermined threshold value. Here, operation for determining whether the relative humidity on the surface of the heater 1 exceeds 100% is performed. For example, the relative humidity at a surface temperature is calculated based on the humidity of air, and the surface temperature of the heater 1 before turning on electricity. Further, in step 163, a storage time of the surface moisture is estimated based on a stopping time before the heater 1 is activated. In step 163, it is determined that condition in which the relative humidity on the surface of the heater 1 is 100%, and the surface moisture amount stored on the surface of the heater 1 is calculated by assuming a continuing time of this condition as the storage time of the surface moisture.

In step 165, the controller 21 determines whether the moisture exceeding the predetermined threshold value is on the surface of the heater 1. In other words, an operation of step 164 is an operation which determines whether it is the wet condition or not. Operations in step 163 and step 164 provide the moisture determining module 44. These steps 163 and 164 can be constituted so that one of the above-mentioned various operations may be performed. When the wet condition is denied in step 164 (NO), the control processing 160 progresses to step 165. If the wet condition is affirmed in step 164 (YES), the control processing 160 progresses to step 171.

In step 165, the controller 21 performs a regular control. In step 166, the controller 21 set a regular output. Here, the regular output is set based on the target temperature signal supplied from the target temperature signal source 27. Step 165 provides the regular output setting module 41. In step 167, the controller 21 sets the regular power supply schedule. Step 167 provides the regular control module 42.

In step 168, the controller 21 controls the electric power supplied to the heater 1 along the regular power supply schedule. Thereby, the temperature of the heater 1 rises to the target temperature, i.e., the radiation temperature, promptly.

The regular power supply schedule is set so that the heater 1 is supplied with a rating electric power permitted to heat it from the initial temperature to the target temperature. In the regular power supply schedule, the heater 1 is heated from the initial temperature to the target temperature by taking a first time period comparatively short. Considering the durability of the heater 1, the regular power supply schedule is set so that a user can be provided with a quick sense of heat.

In step 171, the controller 21 performs a suppressive control. Here, the controller 21 slowly increases the temperature of the heater 1 by taking longer time. In step 172, the controller 21 sets a suppressing time. Step 172 provides the suppressing time signal setting section 45. In step 173, the controller 21 sets the suppressed temperature. Step 173 provides the suppressed temperature signal setting section 46. In step 174, the controller 21 sets the suppressive power supply schedule. Step 174 provides the suppressive control module 47.

In step 168, the controller 21 controls the electric power supplied to the heater 1 along the suppressive power supply schedule. Thereby, the temperature of the heater 1 reaches the target temperature, after being at the suppressed temperature for the suppressing time. In the suppressive control, the heater 1 is slowly heated rather than the regular control.

The suppressive power supply schedule suppresses the electric power supplied to the heater 1 rather than the electric power in the regular control. In the suppressive power supply schedule, the heater 1 is heated from the initial temperature to the target temperature by taking the second time period which is longer than the first time period. The suppressive power supply schedule is set so that the temperature of the heater 1 reach the target temperature after the amount of the surface moisture is sufficiently decreased.

Control processing progresses to step 165, after being at step 171. Thereby, the regular control is performed after activation of the heater 1 is ordered, and after the suppressive control is performed.

Figure 5:
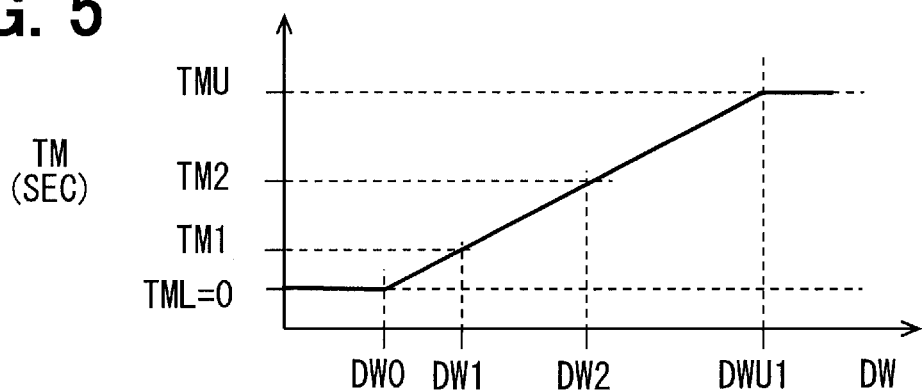
FIG. 5 is a graph showing a control characteristic in the first embodiment.

FIG. 5 shows a setting characteristic of the suppressing time TM in the suppressing time signal setting section 45 and step 172. A horizontal axis shows the moisture amount DW. A vertical axis shows the suppressing time TM. As the moisture amount DW increases greater, the suppressing time TM is set longer. When the moisture amount DW is less than a lower limit DW0 which does not need to decrease the moisture amount, the suppressing time TM is set at a lower limit TML. In this embodiment, the lower limit TML is zero (0). Therefore, even if there is surface moisture, in a case that the amount is only a little, the suppressive control is not performed. The lower limit DW0 is set at a value that conspicuous steam and a smell does not produce, even if the moisture amount boils rapidly and evaporates. When the moisture amount DW exceeds an upper limit DWU1, the suppressing time TM is restricted to an upper limit TMU. It is because the reason for using the heater 1 will fade if the suppressing time TM becomes long too much. The upper limit TMU is desirable to be set so that a user can be provided with a sense of heat more quickly than heating by the air-conditioner 10.

Figure 6:
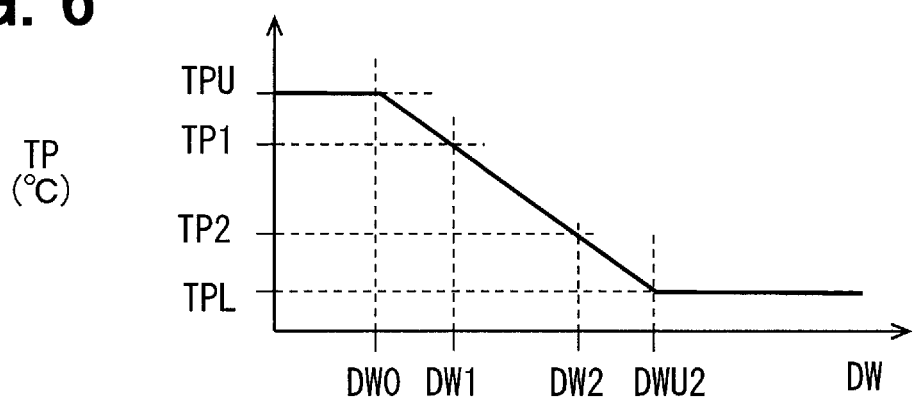
FIG. 6 is a graph showing a control characteristic in to the first embodiment.

FIG. 6 shows a setting characteristic of the suppressed temperature TP in the suppressed temperature signal setting section 46 and step 173. A horizontal axis shows the moisture amount DW. A vertical axis shows the suppressed temperature TP. As the moisture amount DW increases greater, the suppressed temperature TP is set lower. When the moisture amount DW is less than a lower limit DW0 which does not need to decrease the moisture amount, the suppressed temperature TP is set at the upper limit TPU. The upper limit TPU is the target temperature set in the regular control. Therefore, even if there is surface moisture, in a case that the amount is only a little, the suppressive control is not performed. The lower limit DW0 is set at a value that conspicuous steam and a smell does not produce, even if the moisture amount boils rapidly and evaporates. When the moisture amount DW exceeds an upper limit DWU2, the suppressed temperature TP is restricted to a lower limit TPL. It is because the reason for using the heater 1 will fade if the suppressed temperature TP becomes low too much. The lower limit TPL is desirable to be set so that it can reach the target temperature promptly, after the suppressing time TM passes suppressing intense boiling and evaporation of the surface moisture.

Figure 7:
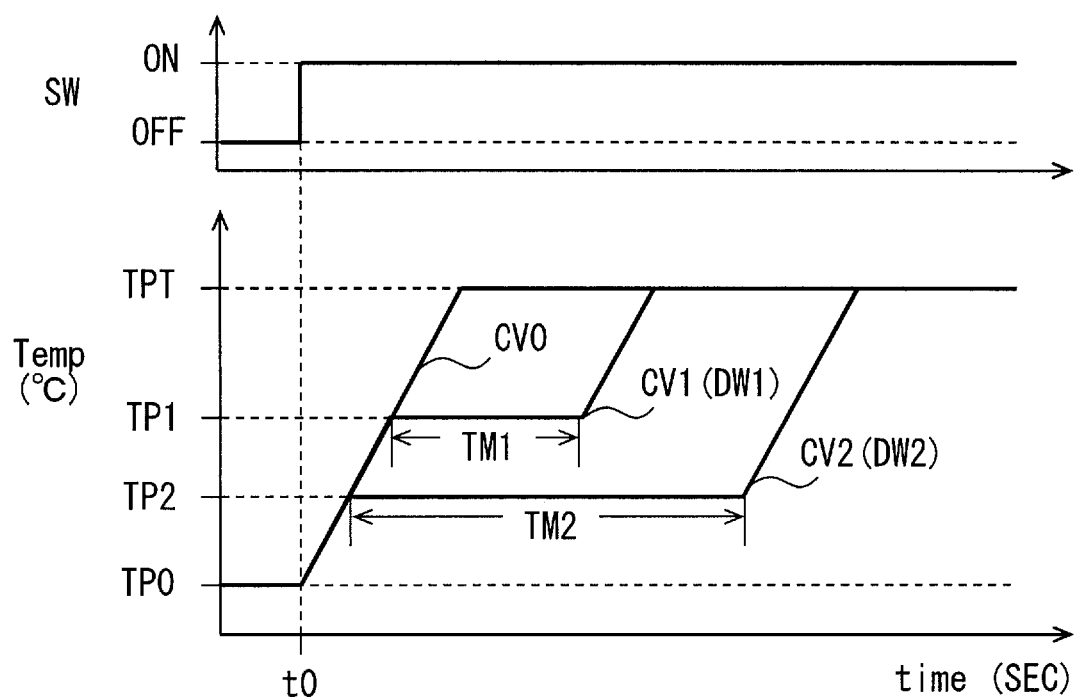
FIG. 7 is a waveform diagram showing operations in the first embodiment.

FIG. 7 shows an example of actuation of the heater 1 by this embodiment. A horizontal axis shows time. An upper row shows an activating signal supplied from the activation signal source 22. A lower row shows the temperature of the heater 1. In time t0, an activating the heater 1 is ordered. The temperature of the heater 1 rises towards the target temperature TPT from an initial temperature TP0.

In the regular control, the temperature of the heater 1 rises rapidly, as illustrated in the waveform CV0. The waveform CV0 corresponds to the regular power supply schedule.

In the suppressive control, the temperature of the heater 1 rises to draw the waveform delayed from the waveform CV0. In the drawing, the waveforms CV1 and CV2 are illustrated.

When it is the moisture amount DW1, the suppressing time TM1 and the suppressing temperature TP1 are set, and the suppressive power supply schedule is set based on these values. At this time, the temperature of the heater 1 changes to draw the waveform CV1. The temperature of the heater 1 is suppressed to the suppressed temperature TP1 lower than the target temperature TPT during the temperature of the heater 1 is in the period of the suppressing time TM1. Thereby, the surface moisture evaporates gradually. Thereby, phenomena, such as steam caused by the surface moisture boiling rapidly and a smell, are suppressed.

When it is the moisture amount DW2 (DW1<DW2), the suppressing time TM2 and the suppressed temperature TP2 are set, and the suppressive power supply schedule is set based on these values. At this time, the temperature of the heater 1 changes to draw the waveform CV2. The temperature of the heater 1 is suppressed at the suppressed temperature TP2 lower than the target temperature TPT during the suppressing time TM2, the surface moisture can evaporate gradually. Even when there is comparatively large amount of the surface moisture, the amount of moisture can be decreased. Thereby, phenomena, such as steam caused by the surface moisture boiling rapidly and a smell, are suppressed.

As shown in the drawing, when the wet condition is not determined, the heater 1 is heated to reach the target temperature TPT for taking the first time period by the regular control module 42. On the other hand, when the wet condition is determined, the heater 1 is heated by the suppressive control part, after that, the heater 1 is heated by the regular control part. When the wet condition is determined, the heater 1 is heated to reach the target temperature TPT by taking the second time period longer than the first time period by the suppressive control module 47 and the regular control module 42.

According to this embodiment, the heater 1 is activated if an activation of the heater 1 is ordered. When the surface moisture is not detected, the heater 1 is promptly heated towards the target temperature. Therefore, a sense of heat is promptly provided to a user. On the other hand, when the surface moisture is detected, the heater 1 is heated to the suppressed temperature lower than the target temperature with the suppressed electric power, after that, it is heated to the target temperature. The surface moisture decreases by the suppressed temperature. Accordingly, there are few amounts of the surface moisture at the time of the heater 1 reaching the target temperature which is smaller than that at the time of the heater 1 is ordered to be activated. Therefore, it is suppressed that generating rapid and large-scale boiling and/or rapid and large-scale evaporation caused by a lot of surface moisture being rapidly heated by the target temperature.

According to this embodiment, it is possible to provide the heater for the interior of a room which can suppress boiling of the surface moisture and/or rapid evaporation of condensed water. In addition, since the regular control and the suppressive control are chosen, it is possible to suffice both offering a quick sense of heat, and suppressing disadvantage resulting from boiling of the surface moisture and/or evaporation of condensed water. In this embodiment, boiling and/or evaporation of the surface moisture in a narrow interior of a room in vehicles are suppressed. Therefore, in the vehicles in which a user tends to notice steam, a smell, etc., it is possible to suppress disadvantages resulting from boiling and/or evaporation of the surface moisture. In this embodiment, it adopts the heater 1 that lowers largely the temperature of a contact part where an object contacts. High target temperature can be used for such the heater 1. According to this embodiment, even if high target temperature is adopted, it is possible to suppress disadvantages resulting from boiling and/or evaporation of the surface moisture.

Second Embodiment

This embodiment is one of modifications based on a basic form provided by the preceding embodiment. In the preceding embodiment, the temperature of the heater 1 is increased in a step by step manner. Alternatively, the temperature of the heater 1 may be increased continuously.

Figure 8:
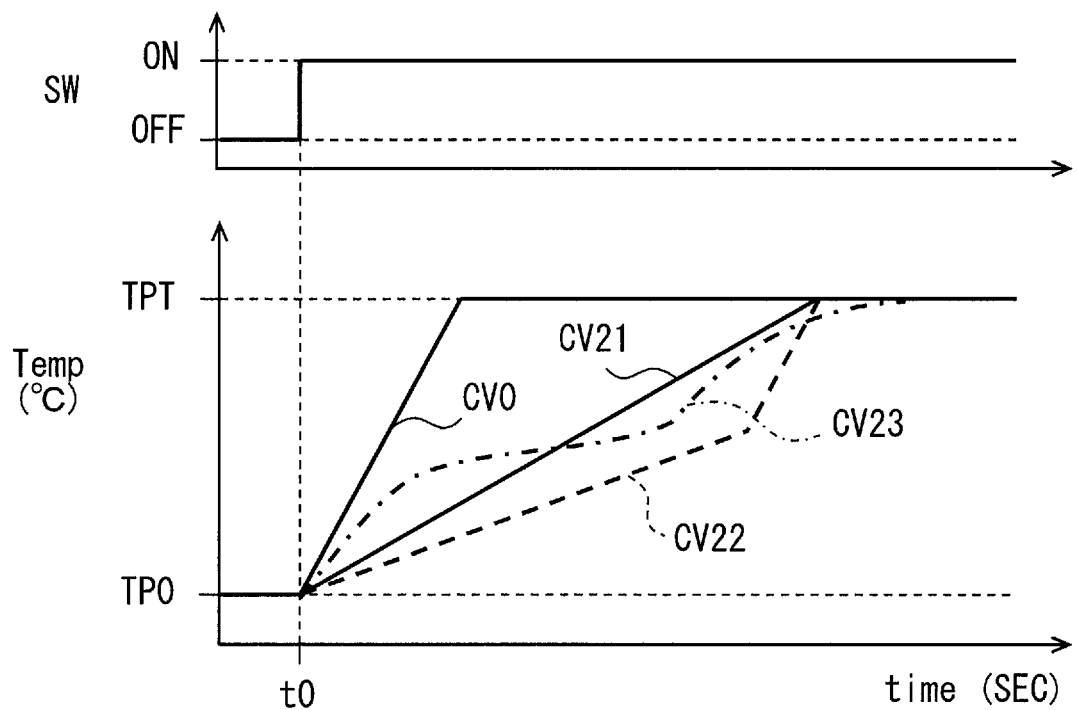
FIG. 8 is a waveform diagram showing operations in a second embodiment.

As shown in FIG. 8, the temperature of the heater 1 in the suppressive control may be increased along a straight line which inclines towards the target temperature TPT from the initial temperature TP0 as shown in a waveform CV21. In this case, boiling and evaporation of the surface moisture are suppressed in comparison with a waveform CV0. In addition, the temperature of the heater 1 may be increased along a plurality of inclined straight lines shown in a waveform CV22. In addition, the temperature of the heater 1 may be increased along a curve shown in a waveform CV23. Even if those waveforms are used, the similar function and effectiveness in the above-mentioned embodiments may be acquired.

Third Embodiment

This embodiment is one of modifications based on a basic form provided by the preceding embodiment. In the preceding embodiment, the regular control and the suppressive control are used. Alternatively, only the suppressive control may be used.

Figure 9:
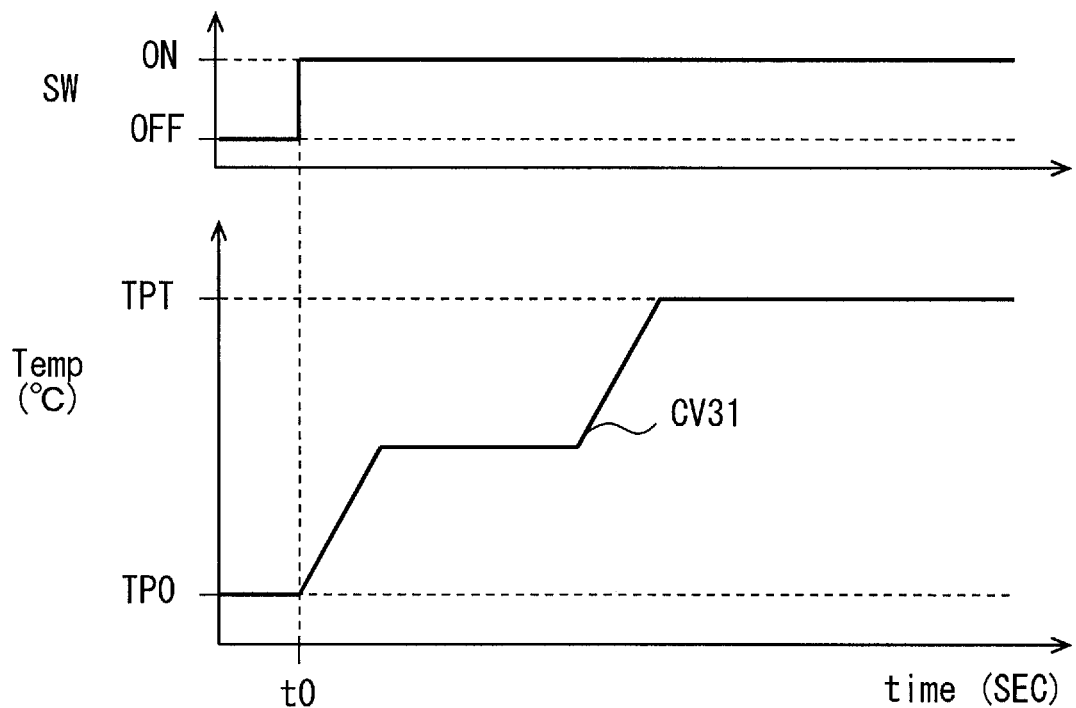
FIG. 9 is a waveform diagram showing operations in a third embodiment.

As shown in FIG. 9, in this embodiment, the temperature of the heater 1 is increased slowly towards the target temperature TPT from the initial temperature TP0 irrespective of whether it is the wet condition or not as illustrated in a waveform CV31. The waveform CV31 is set to suppress rapid boiling and/or evaporation of the surface moisture while realizing a service of the sense of heat quicker than the air-conditioner 10 to a user. According to this embodiment, it is not necessary to have the moisture determining module 44. According to this embodiment, the heater 1 is heated by the regular control module 42 after the heater 1 is heated by the suppressive control module after ordering the activation of the heater 1. According to this embodiment, although the quick nature of the service of the sense of heat is spoiled a little, a problem resulting from rapid boiling and/or evaporation of the surface moisture may be suppressed.

Other Embodiments

The disclosure in this specification is not limited to the above embodiments, and may be practiced in various modified embodiments. The present disclosure is not limited to the above combination, and disclosed technical means can be practiced independently or in various combinations. Each embodiment can have an additional part. The part of each embodiment may be omitted. Part of embodiment may be replaced or combined with the part of the other embodiment. The configurations, functions, and advantages of the above-mentioned embodiments are just examples. Technical scope of disclosure is not limited to the embodiments. It should be understood that some disclosed technical scope may be shown by description in the scope of claim, and contain all modifications which are equivalent to and within description of the scope of claim.

In the preceding embodiments, the heater 1 for vehicle is illustrated. Alternatively, the heater 1 may be disposed on a room of home or a room of business.

In the above-mentioned embodiments, the surface of the heater 1 may be exposed towards the inside of the room. In addition, a heat-resistant interior member may be disposed on the surface of the heater 1. For example, a textile material member or a fabric material member as the interior member may be disposed on the surface of the heater 1.

In the preceding embodiment, the suppressive control maintains the temperature of the heater 1 to the suppressed temperature over the suppressing time. Alternatively, in the suppressive control, the electric power supplied to the heater 1 may be maintained to the suppressed power over the suppressing time. The suppressed power may be standard electric power for realizing the suppressed temperature.

What is claimed is:

1. A heater system comprising:
a heater which is installed indoors of a room of a movable body to emit a heat radiation to feet of a passenger of the movable body, and heated to a target temperature; and
a controller which includes a processor and controls electric power to be supplied to the heater, wherein the controller comprises:
a suppressive control mode which heats, by using the processor, the heater to a suppressed temperature lower than the target temperature with the electric power suppressed so that moisture adhered on a surface of the heater is decreased, after being ordered to activate the heater;
a regular control mode which heats, by using the processor, the heater so that the heater reaches the target temperature; and
a moisture determining mode which determines, by using the processor, a wet condition that an amount of moisture more than a predetermined threshold value is adhered on the surface of the heater, wherein
the suppressive control mode heats the heater to the suppressed temperature over a predetermined suppressing time, wherein the predetermined suppressing time varies based on the amount of moisture,
in a case that the wet condition is not determined, the heater is heated by the regular control mode, and
in a case that the wet condition is determined, the heater is heated by the regular control mode after the heater is heated by the suppressive control mode.

2. The heater system claimed in claim 1, wherein
in the case that the wet condition is not determined, the heater is heated to the target temperature by spending a first time period by the regular control mode, and
in the case that the wet condition is determined, the heater is heated to the target temperature by spending a second time period that is longer than the first time period by the regular control mode and the suppressive control mode.

3. The heater system claimed in claim 1, wherein
the wet condition is determined by estimating a water condensation on the surface of the heater.

4. The heater system claimed in claim 3, wherein
the wet condition is estimated based on at least one of an inside air temperature in the room, an ambient temperature outside the room, and a humidity in the room.

5. The heater system claimed in claim 1, wherein
the wet condition is determined by detecting humidity on the surface of the heater.

6. The heater system claimed in claim 1, wherein
the surface of the heater has water repellence for suppressing adhesion of the moisture.

7. The heater system claimed in claim 1, wherein
the movable body is a vehicle.

8. The heater system claimed in claim 7, wherein
the vehicle has a steering column for supporting a steering wheel, and wherein
the heater is disposed on an underside of the steering column.

9. The heater system claimed in claim 1, wherein
the suppressive control mode suppresses steam or smell perceived by a user.

* * * * *